United States Patent [19]

Chute

[11] Patent Number: 4,787,418

[45] Date of Patent: Nov. 29, 1988

[54] VALVE ASSEMBLY AND FUEL METERING APPARATUS

[75] Inventor: Richard Chute, Harsen's Island, Mich.

[73] Assignee: Colt Industries Inc., New York, N.Y.

[21] Appl. No.: 96,524

[22] Filed: Sep. 15, 1987

[51] Int. Cl.[4] ........................ F16K 11/04; F16K 31/06

[52] U.S. Cl. ........................... 137/625.48; 251/129.18; 251/129.21

[58] Field of Search .............. 137/625.48; 251/129.15, 251/129.18, 129.19, 129.21; 239/583

[56] References Cited

U.S. PATENT DOCUMENTS

| | | | |
|---|---|---|---|
| 1,822,668 | 9/1931 | Protzeller | 251/129.18 |
| 2,548,239 | 4/1951 | Ray | 137/625.33 |
| 2,612,188 | 9/1952 | Persons | 251/129.15 |
| 2,834,570 | 5/1958 | Harrison | 251/129.19 |
| 2,838,068 | 6/1958 | Ray | 137/625.33 |
| 3,955,795 | 5/1976 | Neely | 251/129.15 |
| 4,300,595 | 11/1981 | Mayer et al. | 251/129.01 |
| 4,577,652 | 3/1986 | Blatner | 137/625.28 |
| 4,708,117 | 11/1987 | Mesenich et al. | 123/445 |

FOREIGN PATENT DOCUMENTS

| | | | |
|---|---|---|---|
| 0097981 | 6/1982 | Japan | 251/129.18 |
| 2094946 | 9/1982 | United Kingdom | 251/129.21 |

*Primary Examiner*—George L. Walton
*Attorney, Agent, or Firm*—Walter Potoroka, Sr.

[57] ABSTRACT

A fuel injection fuel supply system for a combustion engine, having a plurality of combustion cylinders and pistons, has a single fuel injector valve effective for injecting all of the required fuel in equal amounts as to each of the combustion cylinders of the engine.

4 Claims, 5 Drawing Sheets

VALVE ASSEMBLY AND FUEL METERING APPARATUS

FIELD OF THE INVENTION

This invention relates generally to liquid metering systems, as for example a fuel metering system for a combustion engine, and paraticularly to the valving assembly means employed within such a liquid metering system wherein a single valving assembly is effective for metering distinct liquid flows simultaneously to a plurality of discrete receiving areas.

BACKGROUND OF THE INVENTION

Even though the automotive industry has over the years, if for no other reason than seeking competitive advantages, continually exerted efforts to increase the fuel economy of automotive engines, the gains realized thereby have been deemed by governmental bodies as being insufficient and such governmental bodies continue to impose increasingly stringent regulations relative to engine fuel economy as well as the maximum permissible amounts of carbon monoxide, hydrocarbons and oxides of nitrogen which may be emitted by the engine exhaust gases into the atmosphere.

In an attempt to meet such stringent regulations, the prior art has heretofore proposed the employment of a carburetor structure provided with electromagnetic duty-cycle valving means whereby the carburetor structure still functioned as an aspirating device but where the rate of fuel flow being aspirated is controllably modified by the duty-cycle valving means in response to feedback signals indicative of engine operation and other attendant conditions. Such carbureting structures, in the main, have not been found to be capable of satisfying the said continually increasing stringent regulations.

The prior art has also proposed the use of fuel metering injection means wherein a plurality of nozzle assemblies, situated as at the intake valves of respective cylinders of a piston engine, would receive fuel, under superatmospheric pressure, from a common fuel metering source and inject such fuel directly into the respective cylinders of the engine with such injection being done in timed relationship to engine operation. Such fuel injection systems, besides being costly, have not proven to be generally successful in that the system is required to provide metered fuel flow over a very wide range of metered fuel flows. Generally, those prior art injection systems which are very accurate at one end of the required range of metered fuel flows, are relatively inaccurate at the opposite end of that same range of metered fuel flows. Also, those prior art injection systems which are made to be accurate in the mid-portion of the required range of metered fuel flows are usually relatively inaccurate at both ends of that same range. The use of feedback means for altering the metering characteristics of such prior art fuel injection systems has not solved the problem of inaccurate metering because the problem usually is intertwined within such factors as: effective aperture area of the injector nozzle; comparative movement required by the associated nozzle pintle or valving member; inertia of the nozzle valving member; and nozzle "cracking" pressure (that being the pressure at which the nozzle opens). As should be apparent, the smaller the rate of metered fuel flow desired, the greater becomes the influence of such factors thereon.

The prior art has also heretofore proposed the employment of a throttle body with one or more electromagnetic duty-cycle type of fuel metering valving assemblies operatively carried thereby and spraying metered fuel, on a continual basis, into the air stream flowing through the throttle body and into the engine induction or intake manifold. Even though such arrangements, generally, are effective for providing closely controlled metered rates of fuel flow, they are nevertheless limited in their ability to meet the said increasingly stringent regulations. This inability is at least in part due to the fact that in such systems the throttle body is employed in combination with an engine intake or induction manifold through which the air and sprayed-fuel mixture is supplied to the respective engine cylinders. Because of design limitations, engine characteristics, cost factors and lack of repeatability in producing substantially identical intake manifolds, certain of the engine cylinders become starved for fuel when other engine cylinders are provided with their required stoichiometric fuel-air ratios. Consequently, the richness (in terms of fuel) of the entire fuel delivery system has to be increased to a fuel-air ratio which will provide the required stoichiometric fuel-air ratio to the otherwise starved engine cylinder or cylinders to obtain proper operation thereof. However, in so doing, the other engine cylinder or cylinders receive a fuel-air supply which is, in fact, overly rich (in terms of fuel) thereby resulting in reduced engine fuel economy and the increased production of engine exhaust emissions.

The prior art has also heretofore proposed the employment of a throttle body, which serves only to control the rate of air flow to an associated engine intake manifold, in combination with a plurality of electromagnetic duty-cycle type of fuel metering valving assemblies wherein respective ones of said plurality of duty-cycle valving assemblies are positioned in close proximity to respective ones of a plurality of engine cylinders as to thereby meter and discharge fuel into the induction system at respective points which are at least closely situated to the intake valves of the associated engine cylinder. In such an arrangement, it is often accepted practice to provide a common manifold of fuel, regulated at superatmospheric pressure, which feeds or supplies unmetered fuel to the respective duty-cycle valving assemblies where the metering function is performed. These systems are very costly in that a plurality of duty-cycle valving and metering assemblies are required and such valving assemblies, to obtain optimum performance, must be flow-matched to each other as sets for the engine. Further, in such arrangements, it is accepted as best practice to replace all duty-cycle valving assemblies upon failure of one or more in order to thereby again result in a matched set of injectors for the engine. Also, in such systems, if one of the injectors or duty-cycle valving means starts to malfunction, and if exhaust constituent sensor and feedback signal generating means are employed, the associated electronic control means will attempt to further increase or decrease (as the case may be) the richness of the fuel-air ratio of the remaining injector assemblies since the exhaust feedback signal cannot distinguish whether the change sensed in the exhaust constituents is due to one or more injector assemblies malfunctioning or whether the overall system needs a modification in the rate of metered fuel flow.

The invention as herein disclosed and described is primarily directed to the solution of the aforestated and other related and attendant problems of the prior art.

SUMMARY OF THE INVENTION

According to the invention, a liquid flow valving assembly comprises valve body means, a plurality of passages formed through said body means, each of said plurality of passages comprising an upstream inlet end and a downstream outlet end, a plurality of valve seating surface means carried by said body means and respectively circumscribing at least respective ones of said plurality of passages, a valve member, said valve member comprising a valving surface means for at times simultaneously sealingly engaging all of said plurality of seating surface means, said valve member being movable in a first direction for causing said valving surface means to sealingly engage said plurality of seating surface means to thereby terminate flow of liquid through each of said plurality of passages, said valve member being movable in a second direction opposite to said first direction to thereby open each of said plurality of passages to the flow of said liquid therethrough, pilot means for piloting said valve member during the time that said valve member is moving in said first direction as well as during the time that said valve member is moving in said second direction, means for causing the movement of said valve member in said first and second directions.

Various general and specific objects, advantages and aspects of the invention will become apparent when reference is made to the following detailed description considered in conjunction with the accompanying drawings.

BRIEF DESCRIPTION OF THE DRAWINGS

In the drawings, wherein for purposes of clarity certain elements and/or details may be omitted from one or more views.

DETAILED DESCRIPTION OF THE PREFERRED EMBODIMENTS OF THE INVENTION

Figure 1:
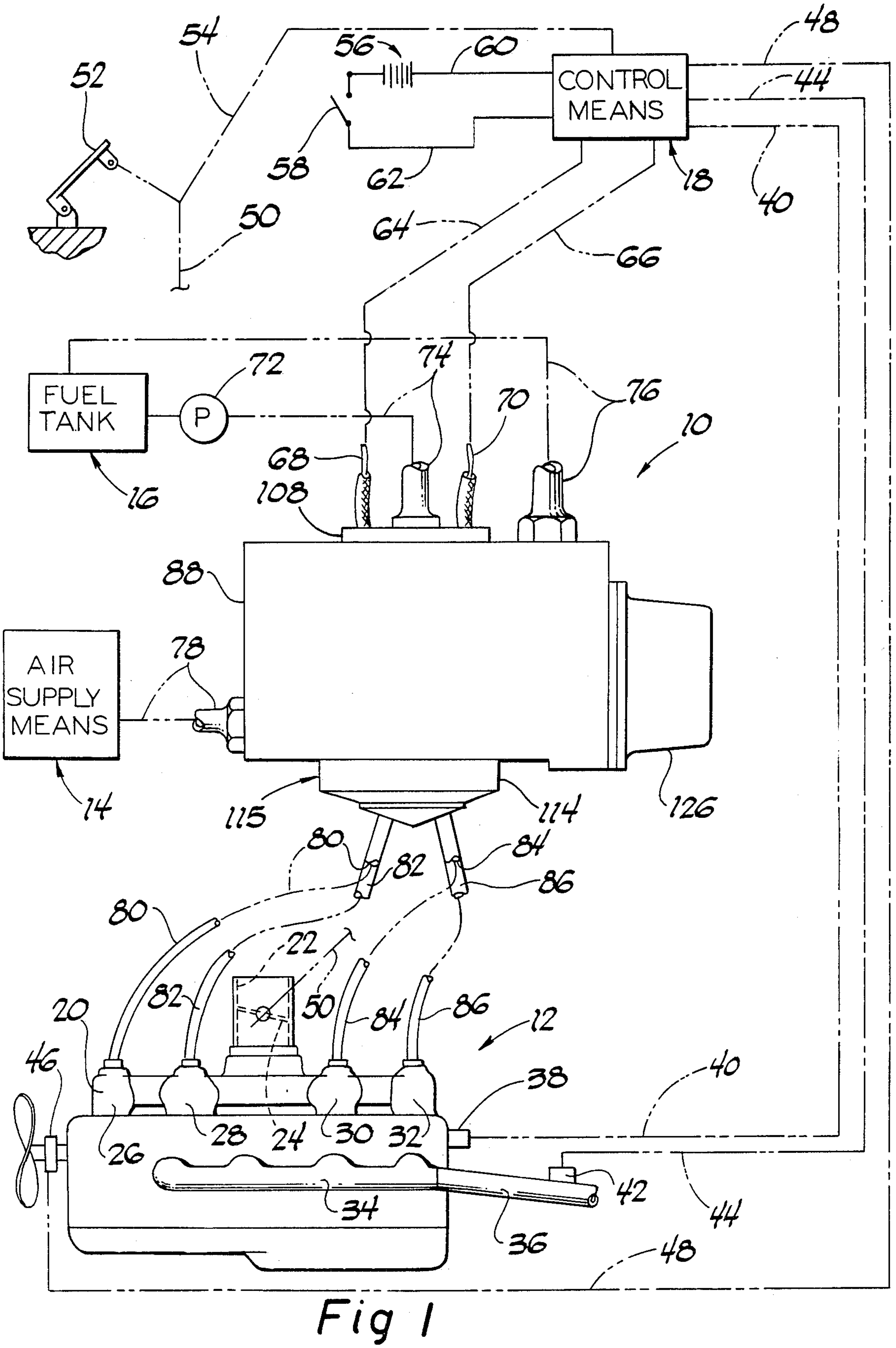
FIG. 1 is a view of a fuel metering assembly, employing teachings of the invention, along with both diagrammatically and schematically illustrated elements and components depicting, in simplified manner, an overall fuel supply and metering system for an associated combustion engine.

Referring now in greater detail to the drawings, FIG. 1 illustrates a fuel metering and delivery apparatus or system 10, a combustion engine 12, an air supply means 14, a fuel reservoir or fuel tank 16 and an associated control means 18.

The engine 12 may be provided with a manifold-like induction passage means 20 which communicates with the ambient atmosphere as by induction passage means 22 having a pivotally mounted and manually positionable throttle valve means 24 therein. An air intake cleaner, not shown but well known in the art, may be operatively connected to the intake end of induction passage means 22. In the embodiment illustrated, the engine 12 is depicted as a four cylinder engine and the induction manifold or passage means 20, as at portions 26, 28, 30 and 32, serves to communicate with the respective intake port means of the respective engine cylinders. As is well known in the art, such intake port means may be controlled by what are commonly referred to as engine intake valves which are opened and closed in timed relationship to engine operation. An engine exhaust manifold 34 communicates with the respective exhaust port means of the respective engine cylinders and with an engine exhaust pipe or conduit 36 which discharges the engine exhaust to ambient.

The control means 18 may comprise, for example, suitable electronic logic type control and power output means effective to receive one or more parameter type input signals and in response thereto produce related outputs. For example, engine temperature responsive transducer means 38 may provide a signal via transmission means 40 to control means 18 indicative of the engine temperature; sensor means 42 may sense the relative oxygen content of the engine exhaust gases (as within engine exhaust conduit means 36) and provide a signal indicative thereof via transmission means 44 to control means 18; engine speed responsive transducer means 46 may provide a signal indicative of engine speed via transmission means 48 to control means 18 while engine load, as indicated for example by the position of the engine induction system throttle valve means 24, may provide a signal as via transmission means 50 operatively connected to an engine operator's foot-actuated throttle pedal lever 52 and operatively connected as by the same transmission means or associated transmission means 54 to control means 18. A source of electrical potential 56 along with related switch means 58 may be electrically connected as by conductor means 60 and 62 to control means 18. The output terminals of control means 18 are respectively electrically connected as via conductor means 64 and 66 to electrical terminals or conductors 68 and 70, of the metering means 10, which in turn are electrically connected to opposite electrical ends of an associated electrical field generating coil means.

The fuel tank or reservoir means 16 supplies fuel to associated fuel pump means 72 (which may be situated internally of the reservoir means 16) which, in turn, supplies fuel at a superatmospheric pressure via conduit means 74 to the inlet of the metering apparatus or means 10. Outlet or return conduit means 76 serves to return excess fuel to an area upstream of the pump 72 as, for example, the fuel reservoir means 16.

The air supply means 14 serves to supply air, via conduit means 78, at a superatmospheric pressure to the metering and supply means 10.

Fuel-air emulsion transporter conduit means 80, 82, 84 and 86 serve to deliver a fuel-air mixture from the metering means to discharge or receiving areas at least in close proximity to the respective engine cylinder intake port means situated generally in the vicinity of the induction portions 26, 28, 30 and 32.

Referring in greater detail to FIGS. 2–11, the metering assembly 10 is illustrated as comprising a main body or housing means 88 with a generally cylindrical counterbore 90 formed therein which slidably receives a generally annular end flux member or washer 92, comprised as of steel, which, in turn, is provided with a first peripheral recess which partly receives and locates an O-ring 94 which prevents fluid (in this case fuel) flow therepast.

A generally tubular shell 96 of magnetic material is closely received within the counterbore 90 and axially abuts against the upper (as viewed in FIG. 2) surface 98 of annular end member 92. The said upper surface 98 has an annular groove formed therein which partly receives and locates an O-ring 100 which serves to seal and prevent the flow of fuel therepast when the juxtaposed axial end 102 of an associated bobbin 104 is seated against surface 98.

The bobbin 104 carries a field coil means 106 which, as previously indicated, is electrically connected to the terminals or control means 68 and 70 (FIG. 1). The entire subassembly comprising the end member 92, shell 96, bobbin 104, coil 106, and conductor means 68 and 70 are secured within the counterbore or chamber 90 as by a suitable clamp 108 and associated suitable fastener means one of which is depicted at 110.

A guide stem and nozzle member 112 is suitably retained as within a cooperating recess, formed in body means 88, and against a cooperating housing portion 114 of what may be considered a distributor assembly 115. An O-ring seal 116, generally between the housing body means 88 and the flange-like end of member 112 serves to prevent fuel flow therepast.

A generally tubular member 118 is piloted on and movable relative to the stem portion of member 112. Generally, upon energization of the coil means 106, member 118 is caused to move upwardly (as viewed in FIG. 2) toward a pole piece means 117 and against the resistance of spring means 119 thereby having its lower flange-like end open the previously closed fluid flow passages or nozzles formed in the guide stem and nozzle member 112.

A fuel pressure regulator assembly 120 is depicted as comprising a first chamber 122 formed in body means 88 and a second chamber 124 formed within a cover-like housing section 126 with a pressure responsive movable diaphragm or wall means 128, suitably peripherally retained, effectively separating and forming a common wall between chambers 122 and 124. A valve carrier 130 has an annular portion 132 thereof held against the chamber 122 side of diaphragm 128 while another portion 134 thereof extends through the diaphragm 128 and through a backing plate 136 to which portion 134 is suitably secured. A spring 138 has one end operatively engaged with backing plate 136 and has its opposite end operatively engaged with a spring perch member which, in turn, is preferably carried by an adjustment screw.

The valve carrier 130 is provided with a cavity which in turn receives a ball valve member 146 which is modified to have a flatted valving surface 148. The ball valve 146 may be retained generally within the carrier cavity as by having a portion 150 of the carrier formed against ball valve 146. Further, the carrier 130 may be provided with a counterbore portion into which a compression spring 152 is fitted as to continually bear against ball valve 146 and thereby, through frictional forces, greatly minimize if not entirely eliminate any tendency of the ball valve 146 moving from its desired orientation for best seating action against the cooperating seating surface 154 of a valve seat member 156 which may have its body pressed into a passageway or conduit 158 formed in body means 88. Additional conduit means 160 serves to complete communication as between valve seat member 156, and conduit 158, and conduit means 76.

Generally, the fuel supplied via conduit means 74 flows through the annular space between the inner cylindrical surface 164 of the tubular portion 166 of bobbin 104 and the outer surfaces 161 and 162 of poee piece means 117 and member 118, as well as the inner cylindrical surface 168 of the flux-path end member 92. Such fuel as flows through such annular space eventually flows into a chamber-like portion 170 from where, as will be desciibed in detail, it is metered to the engine. A conduit 172 communicates with chamber 170 and serves to provide for fuel flow from chamber 170 to chamber 122 where the pressure of such fuel is applied to the diaphragm or movable wall means 128. Generally, whenever the pressure of the fuel exceeds a predetermined magnitude diaphragm means 128 is moved further to the right, against the resistance of spring means 138, thereby moving the ball valve 146 in a direction away from its cooperating seating surface 154 allowing a portion of the fuel to be bypassed via valve seat 156, conduit 158, conduit 160 and return conduit means 76. Such opening and closing movements of pressure regulator valve member 146 serves to maintain a substantially constant fuel metering pressure differential.

A conduit 174, which may be formed in body means 88, receives the superatmospheric air from conduit means 78 and directs such air as to a receiving area of the distributor assembly 115.

The distributor body means 114 is depicted as comprising an upper (as viewed in FIG. 2) mounting surface means 176 which may be employed for mounting against a cooperating surface 178 of body means 88. The lower surface 188 of body means 114 may be of conical configuration with the angle of inclination thereof being, for example, in the order of 9.0° when measured from a horizontal plane or one parallel to surface means 176.

A circular recess or groove 190 may be formed into body means 114 from upper surface 176 thereof so that upon securing body means 114 to housing means 88 such recess or groove 190 effectively becomes a chamber or manifold. A second groove 192 radially outwardly of groove 190 serves to retain an O-ring seal 194 which, when body 114 is secured to housing 88, creates a fluid seal therebetween.

In the embodiment disclosed, keying means are provided in order to maintain a preselected physical relationship among several of the elements and/or details. Such will be later described in greater detail; however, at this point it is sufficient merely to state that cooperating blind (closed end) holes may be formed in the housing means 88 and in body 114 with cooperating keying or locating pins received by such.

In the embodiment shown four substantially equidistantly angularly spaced generally cylindrical passage means, two of which are shown at 200 and 204, are formed through body means 114 in a manner whereby, preferably, the respective axes thereof meet at a common point which also lies in a vertically extending axis 208.

Figure 11:
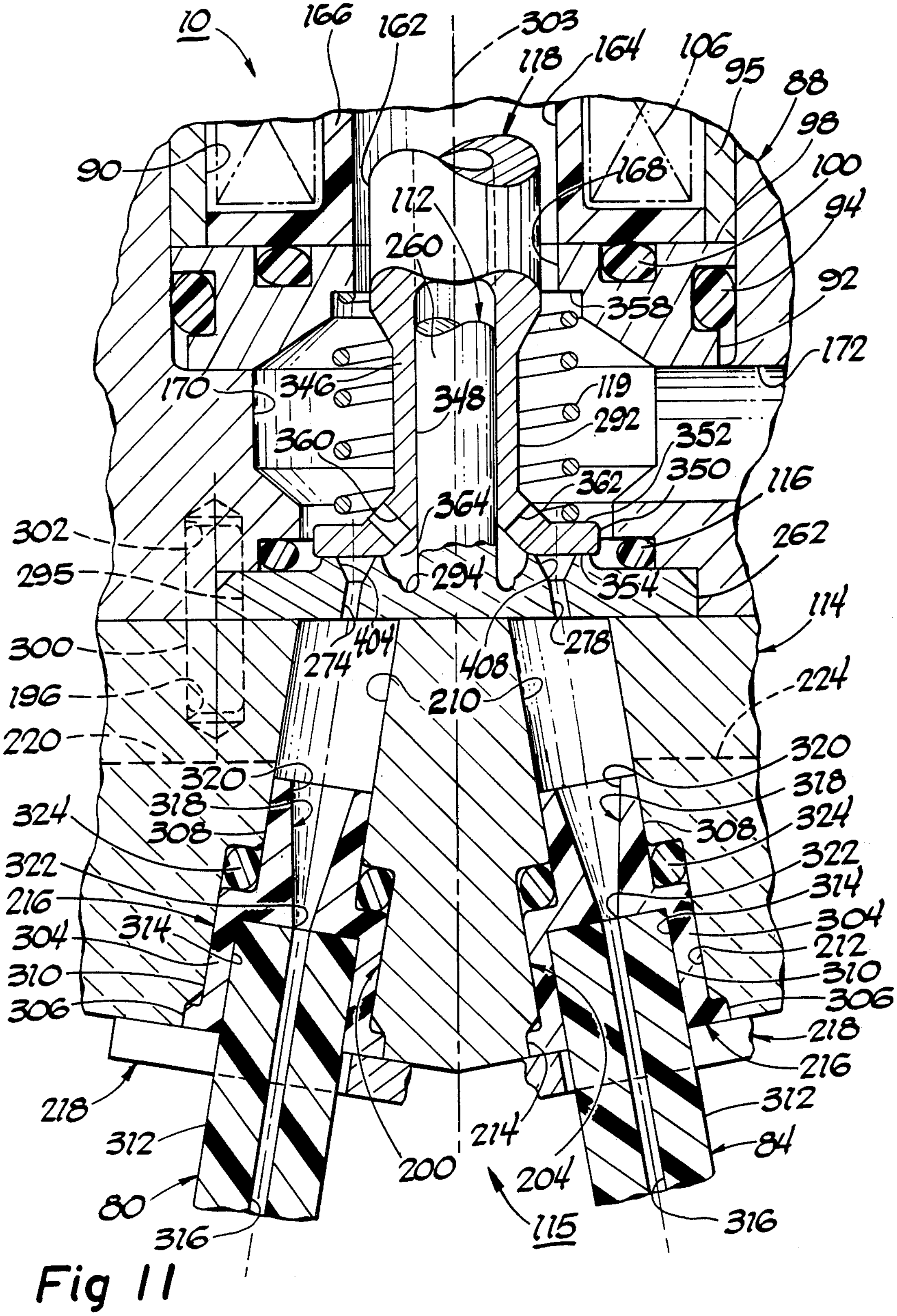
FIG. 11 is an enlarged fragmentary portion of the structure of FIG. 2 as well as a fragmentary portion of the structure of FIG. 1.

Each such passages means, as 200, is preferably comprised of a first cylindrical passage portion 210 communicating, as generally depicted in FIG. 11, with a serially situated relatively enlarged second cylindrical passage portion 212 and a further serially situated still further enlarged cylindrical counterbore 214.

Figure 2:
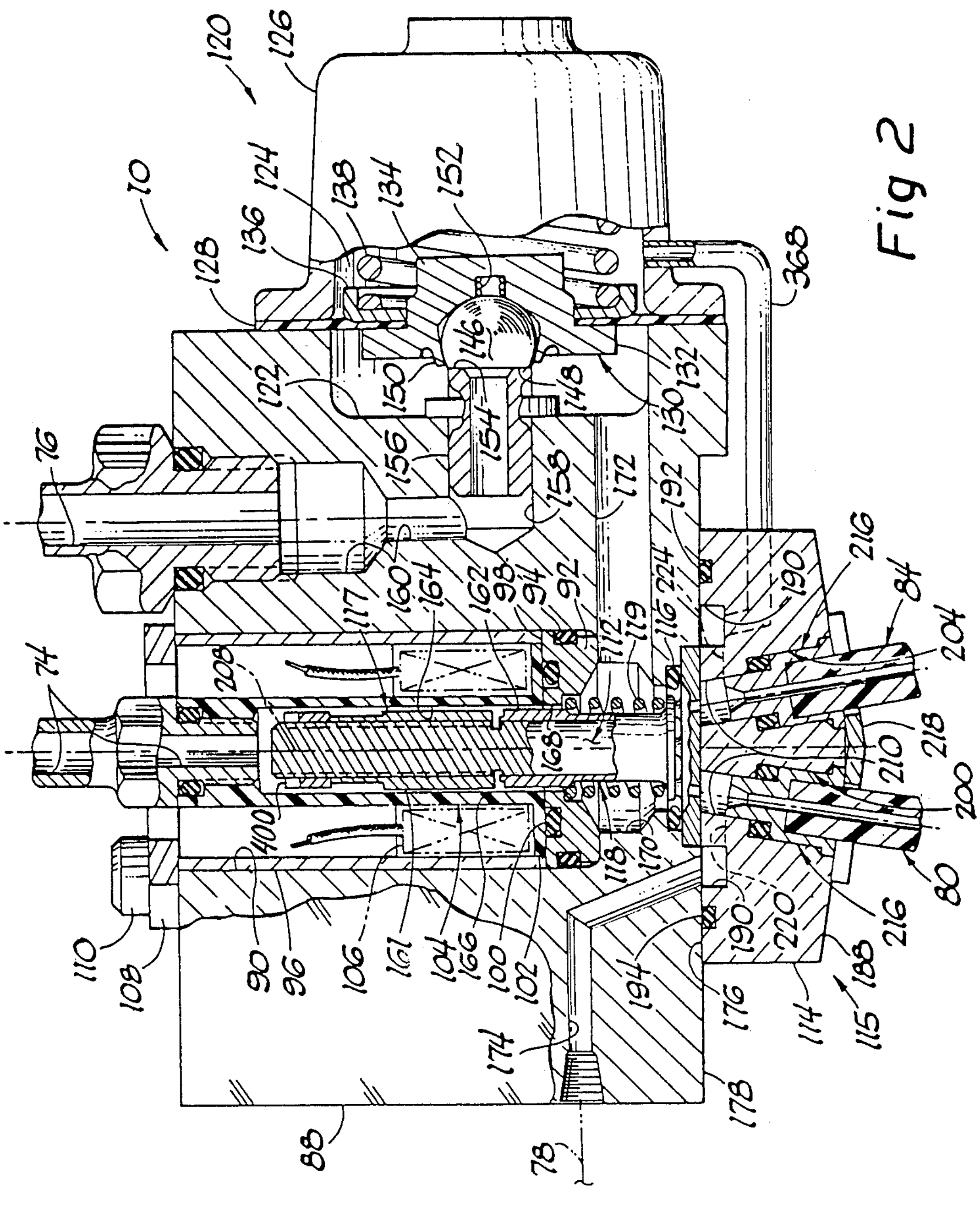
FIG. 2 is a relatively enlarged view of the fuel metering assembly of FIG. 1 with portions thereof broken away and in cross-section.
Figure 3:
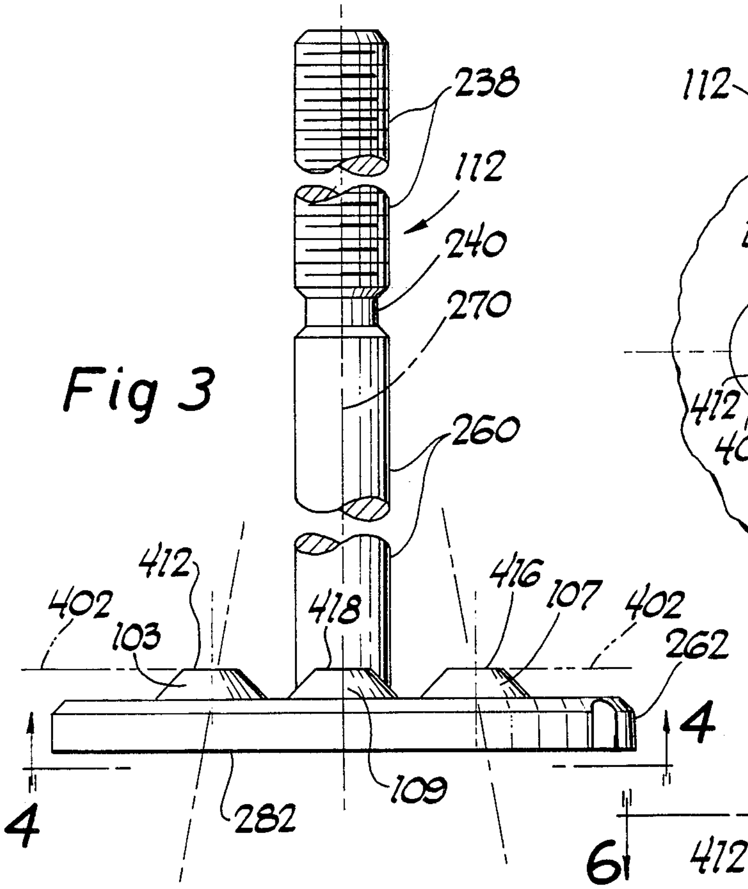
FIG. 3 is a side elevational view, in enlarged scale, of one of the elements of the valving assembly shown in FIG. 2 and employing teachings of the invention.

As best seen in FIGS. 2 and 11, a plurality of generally radially directed slots or recesses, two of which are typically illustrated at 220 and 224 are also formed into body 114 through surface 176 as to respectively complete communication between air distribution chamber 190 and the respective passage means, of which 200 and 204 are typical, when the body 114 is assembled to housing means 88. More particularly, such slots (functionally forming passages) 220 and 224 (and the other two which are not shown) communicate with passage means 200 and 204 (and the other two which are not shown) preferably at and in the respective conduit portions 210 thereof.

In the embodiment illustrated, the fuel-air transport conduit means 80, 82, 84 and 86 are each provided with an end fitting 216 which is sealingly received within the respective four passage means typified by 200 and 204. When thusly received, all of the end fittings 216 may be retained assembled to body 114 as by a suitable retainer or clamping member 218.

When the distributor housing or body 114 is suitably assembled and secured to housing means 88, as generally depicted in FIG. 2, air conduit means 174 is placed in communication with air distribution chamber means 190.

Referring in greater detail to FIGS. 3-6 and 11, the guide stem and nozzle member 112 which, for example, may be formed of stainless steel, is illustrated as comprising a generally cylindrical guide stem portion 260 integrally formed with a disk-like nozzle head portion 262. In the preferred embodiment, nozzle body 262 is provided with a plurality of boss-like or raised portions 103, 105, 107 and 109 which, preferably, have a configuration as that of a frustum. In the embodiment disclosed, such are angularly spaced at 90° about the axis 270 and at substantially equal distances from axis 270. It is also contemplated, as generally depicted in FIG. 11, that the outer surfaces of such bosses 103, 105, 107 and 109 may be blended into the main portion of body 262 as to have a generally curvilinear profile when viewed in axial cross-section.

In the preferred embodiment the upper (as viewed in FIGS. 3 and 5) surfaces of bosses 103, 105, 107 and 109 are formed as to lie in a plane 402 which, in turn, is substantially normal to axis 270.

Inlet passage portions 404, 406, 408 and 410, preferably of conical configuration and opening upwardly, are respectively formed into bosses or raised portions 103, 105, 107 and 109 as to be centrally thereof. Consequently, the remaining upper surface portions of bosses 103, 105, 107 and 109 respectively define valve seating surface means 412, 414, 416 and 418 each of an annular configuration respectively circumscribing the inlets of passage portions 404, 406, 408 and 410.

A plurality of fuel nozzles or passages 274, 276, 278 and 280 are formed in head portion 262 so as to have the respective upper ends (as viewed in FIG. 5) thereof in communication with the lower ends of inlet conduit portions 404, 406, 408 and 410, respectively, and as to have respective lower ends 284, 286, 288 and 290 thereof opening at the lower end surface 282 of head portion 262.

Figure 6:
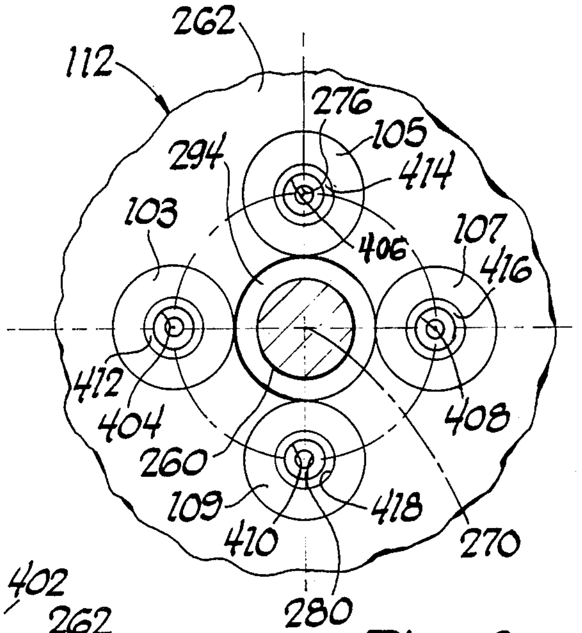
FIG. 6 is an enlarged fragmentary view taken generally on the plane of line 6—6 of FIG. 5 and looking in the direction of the arrows.
Figure 5:
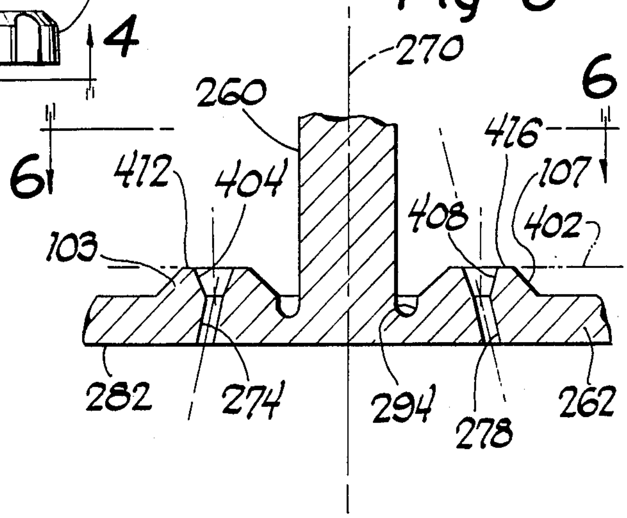
FIG. 5 is a fragmentary axial cross-sectional view taken generally on the plane of line 5—5 of FIG. 4 and looking in the direction of the arrows.

In the embodiment disclosed, there are, by way of example, four of such fuel nozzles 274, 276, 278 and 280 which, as viewed in FIG. 6, are angularly spaced at 90° about the axis 270 and, as viewed in FIG. 5, may be inclined as to have the respective axes thereof inclined as at 9.0° with respect to the central axis 270.

As seen in both FIGS. 5 and 6, in the preferred embodiment, a circular groove or recess 294 is formed in the head portion 266 as to be generally adjacent cylindrical portion 260 and spaced radially inwardly of fuel passage means 404–274, 406–276, 408–278 and 410–280.

Figure 4:
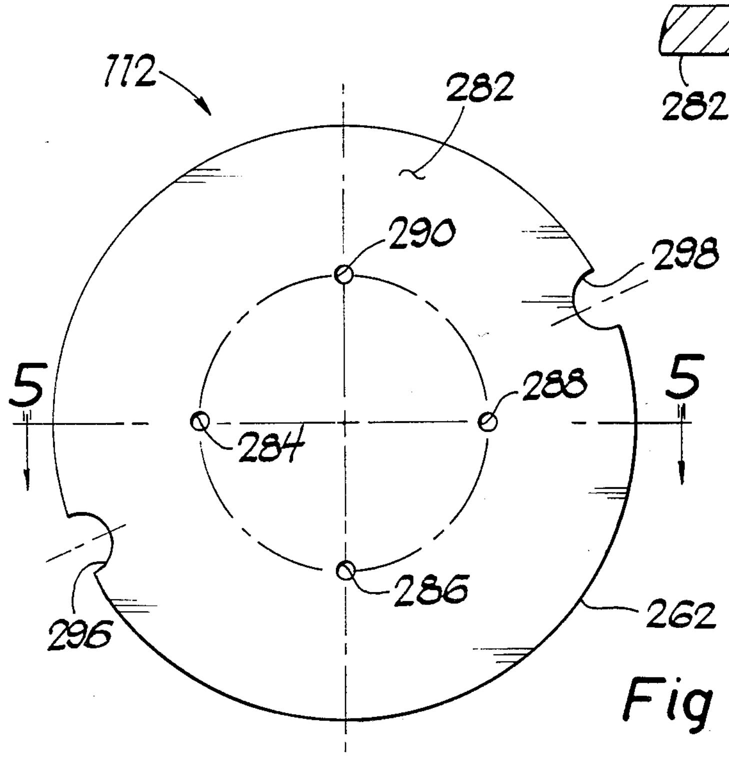
FIG. 4 is a view taken generally on the plane of line 4—4 of FIG. 3 and looking in the direction of the arrows.

As best seen in FIG. 4, diametrically opposite situated keying slots or recesses 296 and 298 may be formed in nozzle head 262 for cooperation with the keying pins previously referred-to as to assure alignment with related components where such is either desired or necessary.

Figure 8:
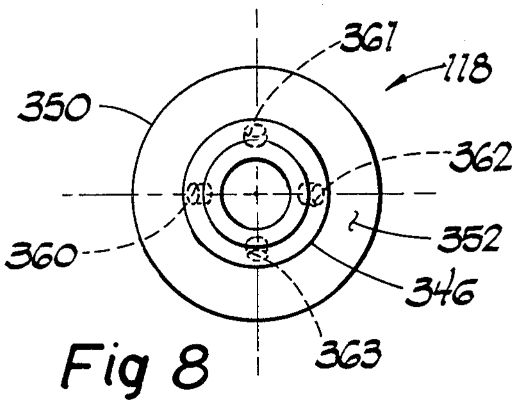
FIG. 8 is a view taken generally on the plane of line 8—8 of FIG. 7 and looking in the direction of the arrows.
Figure 7:
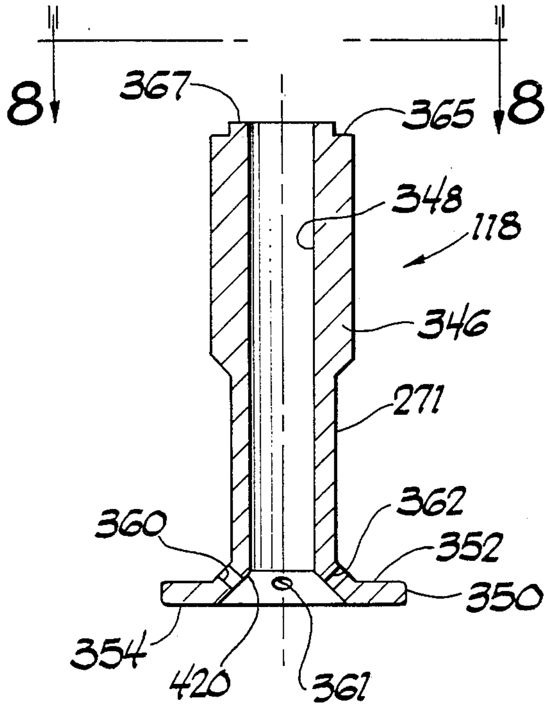
FIG. 7 is an axial cross-sectional view, in enlarged scale, of another of the elements of the valving assembly shown in FIG. 2 and employing teachings of the invention.

FIGS. 7 and 8 illustrate the valving member 118 as comprising a tubular axially extending body 346 of which the inner cylindrical surface 348 is closely slidably piloted on and movable with respect to the guide stem portion 260 of member 112. At its lower end (as viewed in FIG. 7) the valving member 118 has an integrally formed radially outwardly extending annular flange 350 having an upper surface 352, against which one end of spring 119 is engageable as shown in FIGS. 2 and 11, and a lower surface 354 which serves as a valving surface when brought against the valve seating surface means 412, 414, 416 and 418 (see FIGS. 3, 5 and 6) effectively respectively surrounding the fuel passage means 404–274, 406–276, 408–278 and 410–280. The tubular body 346 may be provided with an axially extending portion 271 of reduced outer diameter and have a plurality of holes or passages 360, 361, 362 and 363 formed through an outwardly flaring wall portion 420 of the tubular member 118, generally near the lower end thereof, joining the flange portion 350. Preferably, the upper (as viewed in FIG. 7) end of valve member 118 is formed with an annular stepped portion 365 resulting in a ring-like axial extension 367. The member 118 is formed of magnetic material and as will become apparent serves not only as a valving member but also functions as the armature means.

Figure 10:
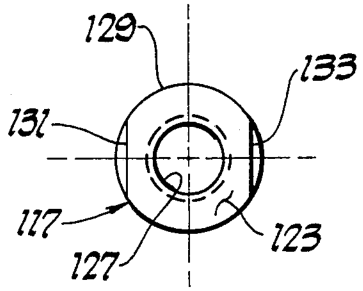
FIG. 10 is a view taken generally on the plane of line 10—10 of FIG. 9 and looking in the direction of the arrows.
Figure 9:
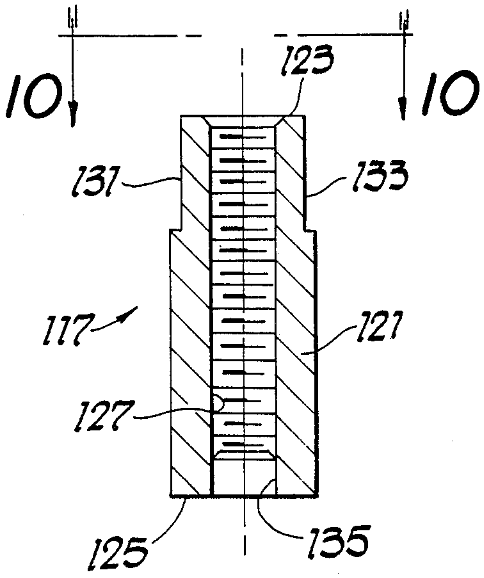
FIG. 9 is an axial cross-sectional view, in enlarged scale, of another element shown in FIG. 2.

FIGS. 9 and 10 illustrate the pole piece means 117 as comprising a cylindrically tubular body 121 having upper and lower (as viewed in FIG. 9) ends 123 and 125 and an internally threaded portion 127. At its upper portion, the outer cylindrical surface 129 has flatted surfaces 131 and 133 formed therein which serve as tool engaging surface means. Preferably an axially extending counterbore 135 is formed in the lower end of body 121. The pole piece 117 is also formed of magnetic material.

Referring in greater detail to FIG. 11 wherein only two of the plurality of fuel-air transporter tubes or conduit means are shown and considered, one of two keying pins 300 (shown out of position for purposes of clarity) is depicted in hidden line as being pressed into a blind hole 196 of distributor body 114, engaging the keying recess 296 of nozzle head 262 and also pressed into an aligned blind hole 302 formed in housing means 88. A like or similar keying arrangement, not shown, is comprised of keying recess 298 of nozzle head 262, blind holes equivalent to 198 and 302 and a keying or locating pin as that shown at 300. When the elements are assembled as depicted in FIGS. 2 and 11, the axes of the elements in FIGS. 3–10 may be considered as forming a single axis 303.

As typically depicted in FIG. 11, each of the end fittings 216, which may be formed of a plastic material such as, for example, nylon, may be of a generally cup-shaped main body portion 304 having a radiating flange portion 306 at its fully open end and a generally cylindrical axially extending body portion 308, of relatively reduced diameter. One end portion 310 of a tubular conduit member 312 is suitably received and contained, as well as retained, with the interior 314 of the cup-shaped main body portion 304. A flow passage 316 through conduit member 312 is thusly placed in alignment with a generally conical passage 318 formed within body portion 308 as to have its outer open end 320 directed toward the associated fuel nozzle (as depicted by respective nozzles or metering passages 274 and 278) and tapering as to have its inner most end 322 of a reduced cross-sectional flow area generally equal to the cross-sectional flow area of flow passage 316. The tubular conduit member 312 may be formed of plastic material such as, for example, "Teflon". "Teflon" is a trademark, of the DuPont de Nemours, E.I. & Co. of Wilmington, Del., United States of America, for materials of tetrafluoroethylene fluorocarbon polymers. Further, during manufacture the end fitting 216 may be molded directly onto the end of tubular conduit member 312 thereby simultaneously joining such and sealing against any flow therebetween. When the fitting 216 and associated tubular member are assembled to the distributor body means 114, the end fitting 216 is closely received with passage or conduit sections 210 and 212 while the flange 306 is forced generally inwardly, by suitable clamping or retaining means 218, into the counterbore 214. A suitable O-ring seal 324 is generally contained and compressed as between juxtaposed shoulders of fitting 216 and the passage means, as for example, means 200 and 204. Each of the fuel-air transporter tubes or conduits 80, 82, 84 and 86 preferably comprises a discharge end fitting which is suitably secured to the engine induction system as in, for example, the engine intake manifold means 20.

As already mentioned, in the embodiment disclosed valving member 118 is also the armature so that upon energization of the coil means 106 the valving member 118 is caused to move upwardly (as viewed in FIGS. 2 and 11) against the resilient resistance of spring 119 thereby opening the fuel passage or nozzle means 404–274, 406–276, 408–278 and 410–280 to the superatmospheric fuel in chamber means 170 and causing the fuel to be metered through nozzle means 274, 276, 278 and 280 with such metered fuel being respectively discharged as through ports 284, 286, 288 and 290 (also see FIG. 4).

OPERATION OF THE INVENTION

The rate of metered fuel flow, in the embodiment disclosed, will be principally dependent upon the relative percentage of time, during an arbitrary cycle time or elapsed time, that the valve member 118 is relatively close to or seated against seating surface means 412, 414, 416 and 418 of the nozzle body portion 262 as compared to the percentage of time that the valve member 118 is opened or away from the cooperating seating surface means 412, 414, 416 and 418.

This is dependent upon the output to coil means 106 from the control means 18 which, in turn, is dependent upon the various parameter signals received by the control means 18. For example, if the oxygen sensor and transducer means 42 senses the need of a further fuel enrichment in the motive fluid being supplied to the engine and transmits a signal reflective thereof to the control means 18, the control means 18, in turn, will require that the metering valve 118 be opened a greater percentage of time as to provide the necessary increased rate of metered fuel flow. Accordingly, it will be understood that given any selected parameters and/or indicia of engine operation and/or ambient conditions, the control means 18 will respond to the signals generated thereby and respond as by providing appropriate energization and de-energization of coil means 106 (causing corresponding movement of valve member 118) thereby achieving the then required metered rate of fuel flow to the engine 12.

More particularly, assuming that the coil means 106 is in its de-energized state, spring 119 will urge valve member 118 downwardly, along the guide stem portion 260, causing the lower axial end face or valving surface 354 thereof to sealingly seat against the cooperating seating surface means 412, 414, 416 and 418 of nozzle body 262 thereby preventing fuel flow from chamber 170 into fuel inlet passages 404, 406, 408 and 410 and through metering passage or nozzle means 274, 276, 278 and 280.

When coil means 106 becomes energized a magnetic flux is generated and such flux includes armature valving member 118 which reacts by being drawn upwardly along guide stem portion 260, against the resistance of spring 119, until such armature valving member 118 operatively abuts against the pole piece means 117 which determines the total stroke or travel of the armature valving member 118. Such total stroke or travel of armature valving member 118, from its seated or closed position to its fully opened position against said related stop means, may be, for example, in the order of 0.05 mm. It should be clear that during the entire opening stroke as well as during the entire closing stroke, the valving member 118 is guided by stem portion 260.

During engine operation, which may include engine cranking, pressurized air is supplied to conduit means 174 by the source 14. The air thusly supplied is directed to the air distribution chamber means 190 generally circumscribing the four passage means of which 200 and 204 are shown. The respective interconnecting passages, of which 220 and 224 are shown, serve to convey the pressurized air from distribution chamber 190 to the respective passage means as 200 and 204 from where it flows toward the generally conical opening 318 of each of the end fittings 216. At the same time the valving member 118 is rapidly being cyclically opened and closed and during the time that it is opened, the pressurized fuel within chamber 170 is metered as solid fuel through each of the nozzles 274, 276, 278 and 280. The fuel as is metered through said nozzles 274, 276, 278 and 280 emerges from outlet or discharge orifices 284, 286, 288 and 290 in a path and direction ideally colinear with the respective axes of nozzles 274, 276, 278 and 280 which, in turn, are ideally respectively colinear with the axes of the end fitting chambers 318 in the passage means as 200 and 204.

As can be seen, especially with reference to FIG. 11, the thusly supplied pressurized air and the metered fuel discharged from the metering nozzle or passage (typically illustrated by 274 or 278) both flow in the same direction toward and into conical chamber 318 which effectively functions as a collecting and/or mixing chamber means. That is, the metered fuel and air flowing into chamber means 318 are effectively collected by such chamber means 318 and experience some degree of intermixing as the resulting stream of commingled fuel and air flows axially along and within chamber means 318 toward flow passage 316. This flow of commingled fuel and air may be considered as a mixture of fuel and air with the air serving as the principal medium for transporting the fuel along or through the transporter passage 316 and to the point of ultimate discharge to the engine as at respective designated receiving areas thereof.

In the disclosed embodiment, the operating pressure of the air supplied to the air distribution means may be, for example, in the range of 15.0 to 40.0 p.s.i.g. (at standard conditions) while the magnitude of the regulated pressure of the fuel in chamber means 170 may be in the order of an additional 1.0 atmosphere differential with respect to the then existing pressure of the air supplied by means 14. The cross-sectional diameter of (each) transporter passage 316 may be in the order of 0.80 to 1.50 mm.

Because of the relatively high magnitude of air pressure supplied by means 14, there is always a high speed flow through the respective transporter passages 316 resulting not only in the fuel-air mixture being transported therethrough but also causing the fuel-air mixture to undergo at least two flow phases resulting in a continuing mixing action of such fuel-air mixture as it flows to be discharged into the receiving area 366. As a consequence of such high speed flow, flow-phase changes and continued mixing of the fuel-air mixture, the mean fuel droplet size, at the point of discharge of the fuel-air mixture to the engine, may be as low as 10–30 microns with the result that such small fuel droplet size greatly reduces the emissions of the engine under lean (in terms of fuel) operating conditions.

In the embodiment disclosed, the existing magnitude of the pressurized air supplied as to the air distributor 190, and therefore the pressure of the air provided to the respective four passage means, of which only 200 and 204 are shown, is communicated to the fuel pressure regulator chamber 124 as to thereby have the pressure differential across the diaphragm means 128 that of the metering pressure differential across the nozzle or metering port means 274, 276, 278 and 280 (including inlet passage portions 404, 406, 408 and 410). In this way the fuel metering differential will remain substantially constant regardless of changes in the magnitude of the air pressure supplied to the air distribution chamber means 190. Although such communication of air pressure to regulator chamber 124 may be accomplished by any suitable means as, for example, by conduitry formed generally internally of housing means 88 and cover 126 which may, in fact, communicate as with the discharge end of conduit 174, such communication is depicted (see FIG. 2), especially for purposes of clarity, by a conduit means 368 situated generally externally and having one end communicating with chamber 124 and having a second end communicating with air distribution chamber means 190.

As shown in FIGS. 2 and 11, the armature-valve means 118, of magnetic material, is closely piloted on the stem and guide means 112 for movement in the axial direction of axis 208 as well as being free to rotate thereabout. The pole piece means 117 is threadably secured to the stem and guide means 112 and adjusted axially as to provide the desired gap as between opposed surfaces 125 and 367 of the pole piece 117 and armature-valve means 118, respectively. A suitable locking nut 400 is also threadably engaged with stem and guide means 112 and locked against the upper end of pole piece means 117 (after the pole piece means has been adjusted to provide the desired gap) to thereby secure the pole piece 117 in its adjusted calibrated position. It is also contemplated that the upper portion of the stem and guide means 112 may be formed without threaded portion 238 (FIG. 3) and that the pole piece 117 be press-fitted thereon to its calibrated position. It is further contemplated that only a relatively short axial length of the upper portion of the stem and guide means 112 be threaded and that the pole piece 117, in the main, be press-fitted onto the non-threaded portion and yet operatively engaged with the threaded portion thereby enabling axial adjustment of the pole piece means 117 by threadable rotation thereof. In such a contemplated arrangement a lock nut as 400 could also be provided.

Still with reference primarily to FIG. 11, it can be seen that in the embodiment illustrated, when valving member 118 is fully seated a generally annular chamber-like space 364 is defined between the lower portion of valve member 118 and the valve body portion 262 generally next adjacent and about stem portion 260. The volume of such chamber-like space 364 may be increased as by the annular groove 294 formed as into body 262. The chamber 364 never becomes a truly closed chamber: (a) because of the space which continues to exist as between adjacent bosses 103, 105, 107 and 109 even when the valve member 118 is fully seated and (b) because of the apertures or passages 360, 361, 362 and 363 which continuously communicate with chamber 170.

Therefore, it should now be evident that even when valve member 118 is fully seated the fuel (supplied by chamber 170) continuously fills the chamber 364, the spaces between adjacent bosses 103, 105, 107 and 109 as well as all the space radially outwardly of such bosses 103, 105, 107 and 109. Consequently, each of the bosses 103, 105, 107 and 109 is totally surrounded by the fuel to be metered even when valve member 118 is fully seated and closed. This enables fuel to flow from all radial directions, about the respective bosses 103, 105, 107 and 109, toward and into the respective fuel passages 404–274, 406–276, 408–278 and 410–280 formed therethrough whenever metering valve 118 is moved to an open position. In this way each of the passages 404–274, 406–276, 408–278 and 410–280 is assured of being filled and acted upon by the pressure of the fuel within chamber 170 every time that valve member 118 is moved toward an open position. As a consequence of providing such bosses or raised portions 103, 105, 107 and 109 for the valve seating means, very low flow velocities are achieved as well as a stable flow condition to the nozzles or passages 274, 276, 278 and 280. Such desired flow characteristics are even further enhanced by reducing the radial width of the seating surface means 412, 414, 416 and 418 to a minimum thereby further reducing the transport time of the fuel thereacross. Also, as depicted entry passages 404, 406, 408 and 410 are wider at their respective open upper ends thereby further enhancing entry flow characteristics.

In view of the foregoing it should be apparent that the invention provides, among other things, a single fuel metering valve member 118 effective for metering fuel to a plurality of spaced fuel-receiving areas or ports as of an engine and does it in a manner whereby at most an extremely small variation exists in the rate of delivered metered fuel flow as between any two of the fuel-receiving areas.

Also as should be apparent, the valving member of the invention, in its preferred embodiment, is of the duty-cycle type which may have an operating cycle ranging, for example, from 50 to 200 (or even more) cycles per second. Even though the fuel being metered is accordingly actually cyclically terminated and initiated, the net effect is to create what may be considered, for practical purposes, a continuous flow but of varying rates depending on the energization and de-energization of the coil means brought about by control means 18.

Further, as should be apparent, in the invention, there is no need to provide any means for positively preventing relative angular rotation as between the valve body 262 and the valving member 118 because regardless of any such relative angular positions, the valving surface means 354 is still effective to sealingly seat against cooperating valve seating surface means 412, 414, 416 and 418 as is needed to open and close the flow through the passages 274, 276, 278 and 280.

In the invention passages 274, 276, 278 and 280 have been disclosed as being inclined as to have their respective axes intersect axis 208. It should be made clear that the invention can be practiced with such nozzle or passage means 274, 276, 278 and 280 being arranged at any desired relationship with respect to axis 208 and that what has been dislosed is by way of example and not of limitation.

Further, all of such passage means 274, 276, 278 and 280 have been disclosed as being substantially equal or effectively equal in their metering characteristics; it is, however, contemplated that the invention may be practiced by having any or all of such nozzle or passage means 274, 276, 278 and 280 differing in their metering characteristics.

Although only a preferred embodiment of the invention has been disclosed and described, other embodiments and modifications of the invention are possible within the scope of the appended claims.

What is claimed is:

1. An improvement in a liquid flow valving assembly comprising valve body means, valve seating surface means carried by said body means, a plurality of passages formed through said body means, each of said plurality of passages comprising an upstream inlet end generally surrounded by said seating surface means and a downstream outlet end, a valve member, said valve member comprising a valving surface means for at times sealingly engaging said seating surface means, said valve member being movable in a first direction for causing said valving surface means to sealingly engage said seating surface means to thereby terminate flow of liquid through each of said plurality of passages, said valve member being movable in a second direction opposite to said first direction to thereby open each of said plurality of passages to the flow of said liquid therethrough, wherein said first and second directions of movement comprise a single axis of movement, stationary stem-like guide means for guiding said valve member along said single axis of movement during the time that said valve member is moving in said first direction as well as during the time that said valve member is moving in said second direction, wherein said plurality of passages are each located in said body means as to be radially outwardly of said stem-like guide means and radially outwardly of said single axis of movement, means for causing the movement of said valve member along said stem-like guide means in said first and second directions, wherein said means for causing the movement of said valve member comprises electrically energizable coil means effective to cyclically produce a flux field for the corresponding cyclic movement of said valve member along said stem-like guide means and in said second direction, and wherein said valve member extends into the region of said coil means and said flux field as to be acted upon thereby, said improvement comprising a plurality of discrete valve seating surfaces forming said valve seating surface means, wherein each of said plurality of discrete valving seating surfaces circumscribes at least respective ones of said plurality of passages, wherein said valve body means comprises a plurality of boss-like portions all projecting in the same general direction toward said valve member valving surface means, wherein said plurality of boss-like portions are space from each other as to provide a space between next adjacent ones of said plurality of boss-like portions with said space being effective to receive therein said liquid to be subsequently supplied to and through said plurality of passages when said valve member is moved in said second direction, wherein respective ones of said plurality of discrete seating surfaces are carried by respective projecting ends of respective ones of said plurality of boss-like projections, and wherein each of said inlet ends of each of said plurality of passages is of a cross-sectional configuration which increases in liquid flow area as each said inlet end approaches the related circumscribing discrete seating surface.

2. An improvement according to claim 1 wherein said plurality of boss-like portions are situated generally equally angularly spaced about said single axis of movement.

3. An improvement according to claim 1 wherein each of said plurality of boss-like portions have at least a major portion of their respective outer surface inclined with respect to the plane of the discrete seating surface carried at the projecting end thereof.

4. An improvement according to claim 1 wherein each of said plurality of boss-like portions have a physical configuration at least closely approximating a truncated cone, and wherein said projecting end portion is formed at the area of truncation.

* * * * *